United States Patent [19]
Yasuoka et al.

[11] Patent Number: 5,473,644
[45] Date of Patent: Dec. 5, 1995

[54] APPARATUS FOR MEASURING POWER OF NUCLEAR REACTOR AND METHOD FOR MANUFACTURING THE SAME

[75] Inventors: Makoto Yasuoka; Naotaka Oda, both of Yokohama, Japan

[73] Assignee: Kabushiki Kaisha Toshiba, Kawasaki, Japan

[21] Appl. No.: 209,072

[22] Filed: Mar. 11, 1994

[30] Foreign Application Priority Data

Mar. 11, 1993 [JP] Japan ................... 5-050939

[51] Int. Cl.$^6$ .................................................. G21C 17/00
[52] U.S. Cl. ...................... 376/254; 376/247; 376/241; 376/245
[58] Field of Search ..................... 376/247, 245, 376/254, 241; 976/DIG. 238, DIG. 237, DIG. 239; 250/336, 395

[56] References Cited

U.S. PATENT DOCUMENTS

| | | | |
|---|---|---|---|
| 3,628,018 | 1/1972 | Gasper | 250/83.1 |
| 4,298,430 | 11/1981 | Rolstad et al. | 376/247 |
| 4,393,025 | 7/1983 | Leyse | 376/247 |
| 4,439,396 | 3/1984 | Rolstad | 376/247 |
| 4,440,716 | 4/1984 | Smith | 376/247 |
| 4,602,767 | 7/1986 | Spiegelman et al. | 266/87 |
| 5,221,916 | 6/1993 | McQueen | 338/24 |

FOREIGN PATENT DOCUMENTS

58-53759 12/1983 Japan.
3-73834 11/1991 Japan.

Primary Examiner—Donald P. Walsh
Assistant Examiner—Meena Chelliah
Attorney, Agent, or Firm—Oblon, Spivak, McClelland, Maier & Neustadt

[57] ABSTRACT

An apparatus for measuring the power of a nuclear reactor having a sensor assembly disposed in a core section inside the nuclear reactor. The sensor assembly includes a cover tube made of metal and press-fitted on the outer surface of a rod-shaped core tube made of metal, a plurality of annular gaps defined between the cover tube and the core tube at different positions spaced from each other in the axial direction of the core tube, a plurality of axial grooves formed in the core tube while opening on the outer surface of the core tube and extending in the axial direction of the core tube, and a plurality of temperature sensors individually guided in the axial grooves and disposed on the core tube. The temperature sensors of the sensor assembly detect temperature distribution in portions of the core tube which face the annular gaps so as to measure the power of the nuclear reactor. By virtue of the above construction, the apparatus can be manufactured easily, has high precision of temperature measurement, and has a sufficiently high reliability for reducing problems such as disconnection and insulation failure.

13 Claims, 6 Drawing Sheets

APPARATUS FOR MEASURING POWER OF NUCLEAR REACTOR AND METHOD FOR MANUFACTURING THE SAME

BACKGROUND OF THE INVENTION

1. Field of the Invention

The present invention relates to an apparatus for measuring the power of a nuclear reactor, such as a light-water reactor (LWR), and to a method for manufacturing such an apparatus.

2. Discussion of the Background

In a conventional light-water reactor, such as a boiling-water reactor, the power of the reactor is measured by detecting the neutron flux within the reactor. Neutron sensors which have been used for this purpose are roughly divided into two systems comprising a local power range monitoring system (hereinafter referred to as "LPRM") serving as a fixed fission ionization chamber in the reactor, and a traversing incore probe system (hereinafter referred to as "TIP") serving as a movable fission ionization chamber.

The LPRM, which is a system at a fixed position in the reactor, employs a uranium isotope as a substance for reacting with neutrons in the reactor. As a result, the LPRM has the following disadvantages: the uranium isotope is consumed as the use of the LPRM proceeds, thereby involving the risk that sensitivity to neutrons may be decreased, and accordingly, the measurement precision of the system may be deteriorated. Since the neutron flux varies among various locations in the reactor at which the LPRM sensors are provided, the use of the system involves great variations in sensitivity among various locations in the reactor.

In view of these disadvantages, the TIP is also used during operation of the reactor, such as a boiling-water reactor, in order to calibrate the sensitivity of the LPRM with respect to the neutron flux, so that variations in the sensitivity of the LPRM sensors can be calibrated.

In order to use the TIP for the purpose of calibrating the sensitivity of the LPRM sensors, however, a large-scale drive mechanism for moving the TIP within the reactor is required to be accommodated at a location below the reactor pressure vessel. The drive mechanism requires great labor for its maintenance. In addition, when the TIP is taken out of the reactor, handling of the TIP, which is activated, involves the risk of the operators may be exposed to radiation.

For these reasons, it has recently been conceived to omit the use of the TIP, and use, instead of the TIP, another type of reactor power measurement apparatus in combination with the LPRM. This type of apparatus, which is referred to as a γ-thermometer, comprises a system of sensors at a fixed position in the reactor that does not require a drive mechanism, nor does it involve substantial deterioration of sensitivity.

The γ-thermometer is a type of reactor power measurement apparatus which detects the quantity of heat attributable to radiation (γ-rays). Specifically, the γ-thermometer has a structure of stainless steel or a like material which is disposed in the sensor sections of the γ-thermometer and which is capable of generating heat by absorbing energy as a result of the absorption or inelastic scattering of radiation (specially γ rays) within the reactor, and also has thermocouples or the like for measuring the temperature distribution formed when the generated heat is transferred to an external coolant. In contrast with a fission ionization chamber, the γ-thermometer does not, in principle, involve sensitivity deterioration.

Figure 9:
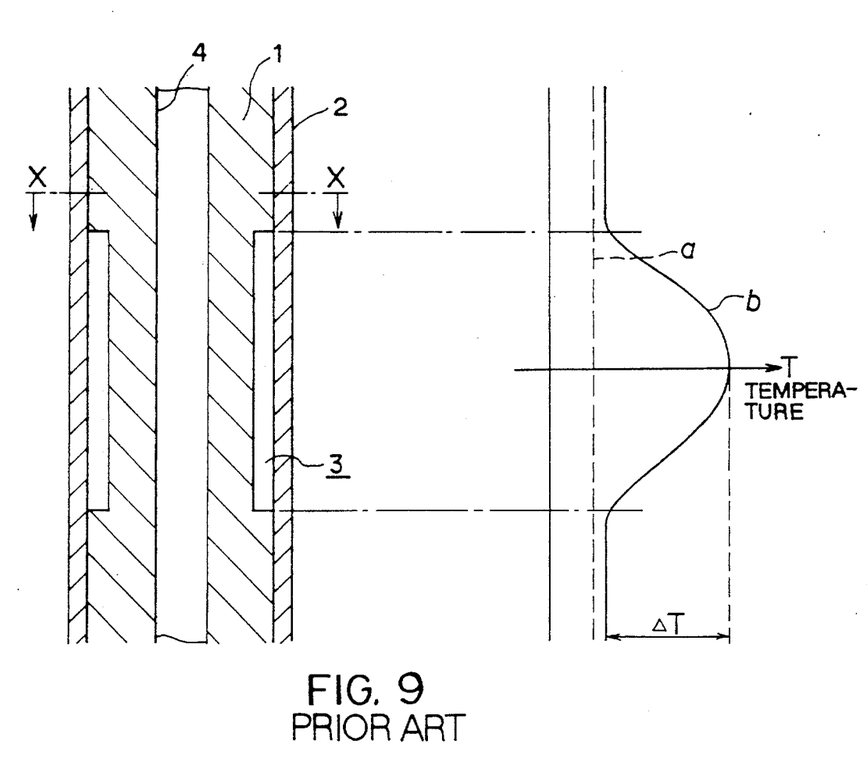
FIG. 9 depicts the construction of a sensor section of a conventional power measurement apparatus for a nuclear reactor, as well as temperature distribution in the axial direction of a core tube of the conventional apparatus.
Figure 10:
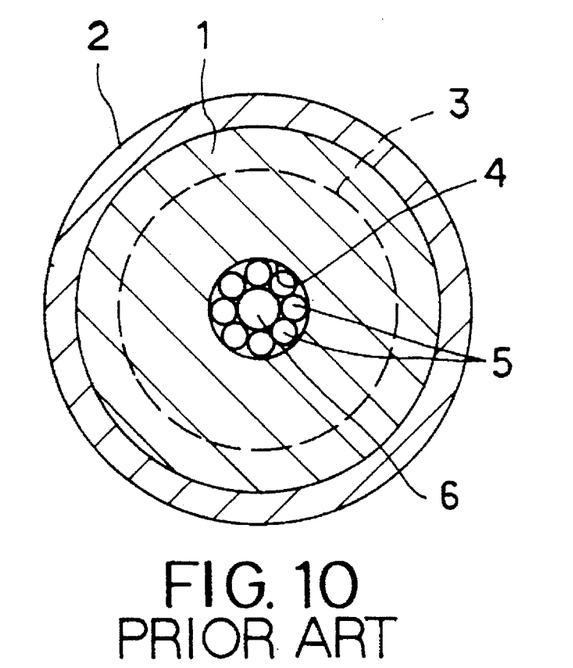
FIG. 10 is a cross-sectional view taken in a plane token along line X—X shown in FIG. 9.
Figure 11:
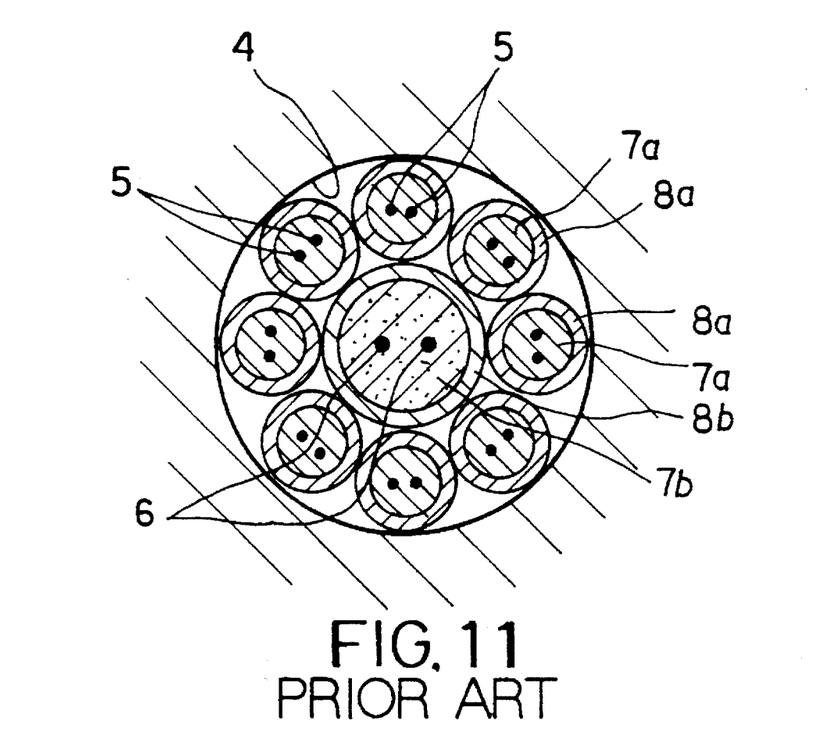
FIG. 11 is an enlarged view showing an example of the arrangement of thermocouples and a heater of the conventional apparatus shown in FIG. 9.

FIG. 9 to FIG. 11 show the construction of a sensor section of a γ-thermometer serving as a conventional power measurement apparatus for a nuclear reactor, the distribution of temperature in the axial direction of a core tube of the apparatus, and the arrangement of thermocouples and a heater in the sensor section. The reactor power measurement apparatus forms an elongated, rod-shaped structure having a plurality of such sensor sections in the axial direction.

The sensor section has a double-tube construction comprising a core tube 1 and a cover tube 2. A gap 3 is provided between the core tube 1 and cover tube 2 around the circumference of the interface of these tubes 1 and 2, the gap 3 serving as an adiabatic portion for providing temperature distribution with a great variation range. Heat is transferred from the core tube 1 to the cover tube 2 through surfaces of contact therebetween. The distribution of temperature in the axial direction of the core tube 1 is such that when the sensor section generates no heat, temperature distribution is flat, as indicated by broken curve a in FIG. 9, whereas when the sensor section generates heat due to radiation in the reactor, temperature T rises in the center of the axial dimension of the gap 3, as indicated by solid curve b.

This is because, in the reactor power measurement apparatus, when the core tube 1, irradiated by γ radiation, generates heat, the heat is conducted from the core tube 1 to the cover tube 2 through a pair of routes that bypass upper and lower portions of the gap 3 which are respectively above and below the center of the gap 3 in the axial direction. The increment in temperature $\Delta T$ at the axial center of the gap 3 with respect to temperature at other locations of the gap 3, corresponds to calorific power, that is, a radiation dose or fuel power in the vicinity of the sensor section. Thus, measurement of such temperature increment $\Delta T$ enables the measurement of the power of the relevant nuclear reactor.

In order to measure such temperature increment $\Delta T$, a plurality of thermocouples 5 of a number corresponding to the number of the sensor sections, as well as a heater 6 for calibrating the sensitivity of the sensors, are received in an inner bore 4 formed in the inner tube 1. As shown in FIG. 11, each of the thermocouples 5 is coated with an insulating coating 7a and a metal coating 8a, while the heater 6 is coated with an insulating coating 7b and a metal coating 8b.

In order that the conventional power measurement apparatus for a nuclear reactor can accurately measure the temperature of the core tube 1, the metal coatings 8a of the thermocouples 5 must tightly contact the core tube 1. In the manufacturing of a power measurement apparatus for a reactor having the above sensor construction, however, since the metal coatings 8a of the thermocouples 5 cannot be tightly contacted with the core tube 1 by brazing or soldering the metal coatings 8a to the core tube 1, the following process is adopted: the thermocouples 5 and the heater 6, each coated with the insulating coating 7a or 7b and the metal coating 8a or 8b, are inserted into the inner bore 4 of the inner tube; thereafter, the core tube 1 is swaged or caulked to bring the core tube 1 into press contact with the metal coatings 8a of the thermocouples 5; and finally, the cover tube 2 is fitted on the outer surface of the core tube 1, and swaged to press-contact the cover tube 2 on that outer surface.

This process, however, has some problems. When the swaging of the core tube 1 is so insufficient that the metal coatings 8a of the thermocouples 5 are not tightly contacted with the inner surface of the core tube 1, and the temperature cannot be accurately measured. When the core tube 1 is so strongly caulked that the strong force applied to the core tube 1 causes deformation of the insulating coatings 7a and the metal coatings 8a of the thermocouples 5, this may cause problems in the apparatus, such as disconnection or insulation failure.

Similar problems may be caused in the conventional apparatus due to the arrangement in which, in order to calibrate the sensitivity of each sensor, the heater 6 received in the inner bore 4 is caused to heat the core tube 1, so that a temperature distribution approximating the temperature distribution formed by heat generation due to radiation, is formed in the core tube 1. In the conventional arrangement, since the thermocouples 5 are disposed in the vicinity of the heater 6, the thermocouples 5 may be heated excessively, and this involves the risk of disconnection, insulator failure, etc.

SUMMARY OF THE INVENTION

In view of the above-described circumstances, an object of the present invention is to provide an apparatus for measuring the power of a nuclear reactor that can be manufactured easily, has high precision of temperature measurement, and has a reliability sufficiently high for reducing problems such as disconnection and insulation failure, and a method for manufacturing such an apparatus.

In order to achieve the above object, according to the present invention, there is provided an apparatus for measuring the power of a nuclear reactor, the apparatus having a sensor assembly disposed in a core section inside the nuclear reactor. The sensor assembly comprises: a rod-shaped core tube made of metal; a cover tube made of metal and press-fitted on the outer surface of the core tube; a plurality of annular gaps defined between the cover tube and the core tube at different positions spaced from each other in the axial direction of the core tube; a plurality of axial grooves formed in the core tube while opening on the outer surface of the core tube and extending in the axial direction of the core tube; and a plurality of temperature sensors individually guided in the axial grooves and disposed on the core tube, the temperature sensors of the sensor assembly detecting temperature distribution in portions of the core tube which face the annular gaps so as to measure the power of the nuclear reactor.

In another form of an apparatus for measuring the power of a nuclear reactor according to the present invention, the core tube has an inner bore formed in a central portion of the core tube, and a plurality of annular recesses (gaps) formed around the circumference of the core tube by recessing the core tube from the outer surface thereof at different positions of the core tube spaced from each other in the axial direction of the core tube, the inner bore receiving a rod-shaped heater press-fitted and retained therein, each pair of adjacent annular recesses communicating with each other through one of the axial grooves comprising grooves which are arranged in a radial pattern with their depths lying in radial directions and which extend in the axial direction of the core tube. The core tube may be arranged to form a metal coating for the rod-shaped heater, which metal coating is disposed on an insulating coating on the body of the rod-shaped heater.

In order to achieve the above object, according to the present invention, there is also provided a method for manufacturing an apparatus for measuring the power of a nuclear reactor, the method comprising the steps of: press-fitting a rod-shaped heater in an inner bore in a central portion of a rod-shaped core tube made of metal; forming a plurality of annular recesses around the circumference of the core tube by recessing the core tube from the outer surface thereof at different positions of the core tube spaced from each other in the axial direction of the core tube; forming a plurality of axial grooves in the core tube such that the axial grooves open on the outer surface of the core tube and extend in the axial direction of the core tube; disposing a plurality of temperature sensors in the individual axial grooves; and press-fitting a cover tube made of metal on the outer surface of the core tube.

A power measurement apparatus for a nuclear reactor according to the present invention has a sensor assembly constructed such that a plurality of annular gaps are defined between a rod-shaped core tube made of metal and a cover tube press-fitted on the outer surface of the core tube and are formed at positions spaced from each other in the axial direction of the core tube, and that a plurality of temperature sensors are individually disposed in a plurality of axial grooves formed in the core tube while opening on the outer surface of the core tube and extending in the axial direction of the core tube. This construction enables the temperature sensors to be readily retained in the axial grooves by bringing the temperature sensors into close contact with the bottoms of the axial grooves from the outside of the core tube. Thus, the reactor power measurement apparatus, having annular gaps between the cover tube and the core tube and also having temperature sensors closely contacting the core tube, can be manufactured simply and easily.

Since the reactor power measurement apparatus has the annular gaps between the cover tube and the core tube and also has the temperature sensors closely contacting the core tube, the apparatus has high precision of temperature measurement while being less vulnerable to problems such as disconnection and insulation failure, that is, being highly reliable.

When a rod-shaped heater is press-fitted and retained in an inner bore formed in a central portion of the core tube, the sensitivity of the sensor assembly can be calibrated by the heating action of the heater without involving the risk of the temperature sensors, whose measurement members comprise thermocouples or the like, may be excessively heated. This is another construction that helps the apparatus reduce problems such as disconnection and insulation failure.

DESCRIPTION OF THE PREFERRED EMBODIMENTS

An embodiment of an apparatus for measuring the power of a nuclear reactor according to the present invention will now be described with reference to the accompanying drawings.

Figure 1:
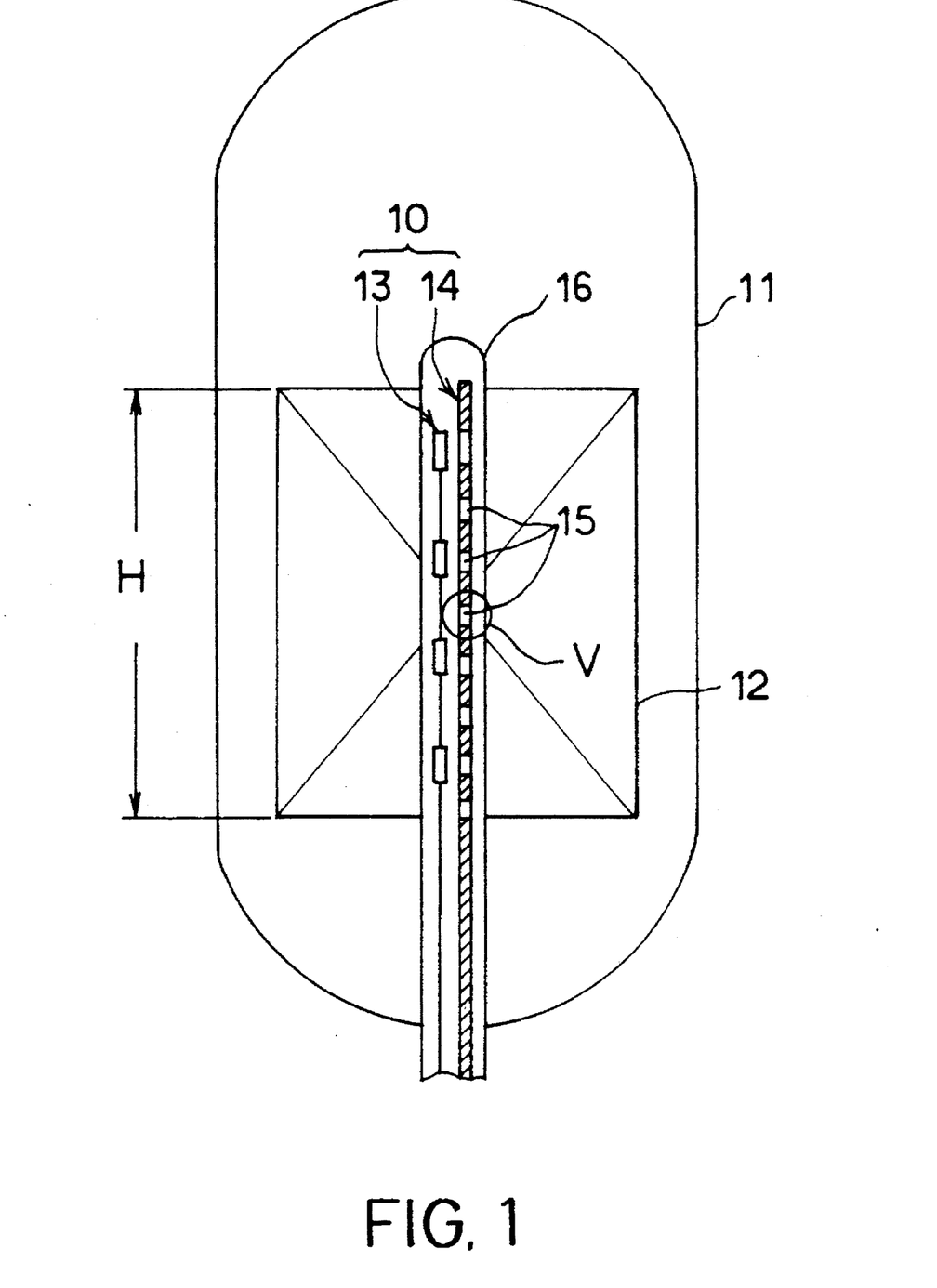
FIG. 1 is a view explaining the principles of a power measurement apparatus for a nuclear reactor according to the present invention.

FIG. 1 schematically shows a power measurement apparatus for a nuclear reactor, such as a boiling-water reactor, according to the present invention. A plurality of reactor power measurement apparatuses 10 are disposed at different positions in a core section 12 inside a nuclear reactor 11, though only one of the apparatuses 10 is shown in FIG. 1. Each reactor power measurement apparatus 10 has a local power range monitoring system (LPRM) 13 serving as a fission ionization chamber at a fixed position in the reactor, and a rod-shaped γ-thermometer 14 provided at a fixed position in the reactor to serve as an in-reactor detector for calibrating reactor power measurement. The LPRM 13 has a construction which is no different from that of a conventional LPRM, and that construction will not be described to avoid redundancy.

The γ-thermometer 14 constitutes an elongated rod-shaped sensor assembly having an outer diameter of 10 mm or thereabout. The γ-thermometer 14 need not be used to calibrate reactor power measurement in the reactor, but may be used to measure the reactor power. Further, the γ-thermometer 14 may be formed as either a structure integrated with the LPRM 13 to be included in an LPRM string 16, as shown in FIG. 1, or a structure separate from the LPRM 13 to be provided independently.

Figure 2:
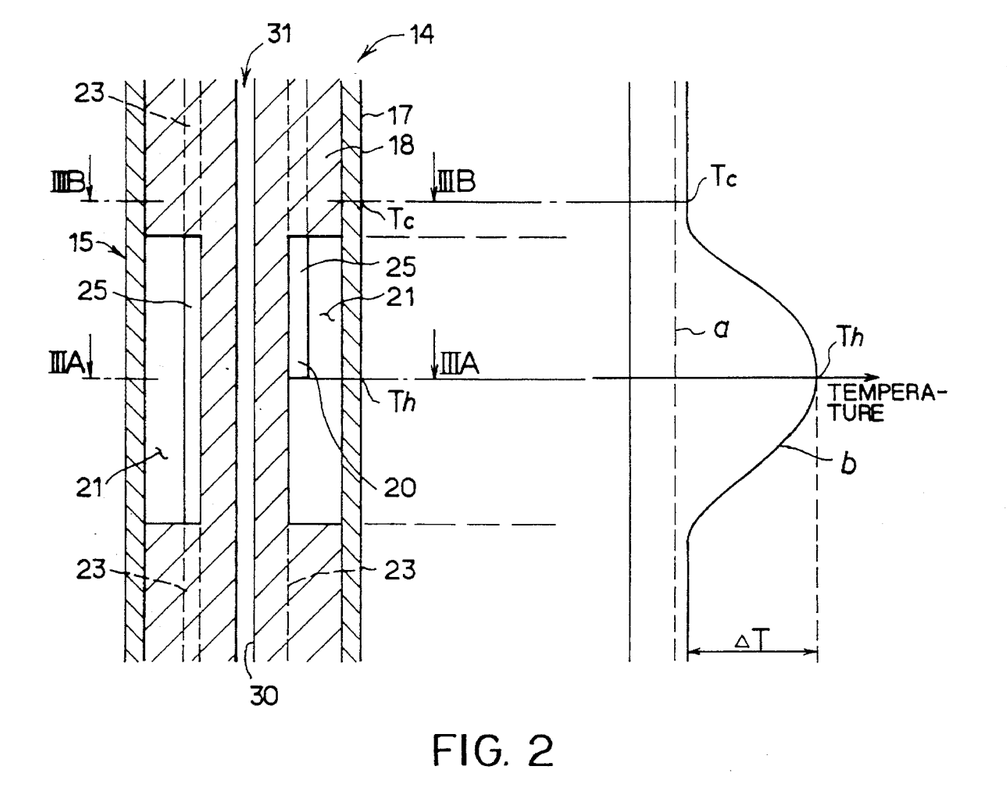
FIG. 2 depicts the construction of a sensor section of an embodiment of a power measurement apparatus for a nuclear reactor according to the present invention, as well as temperature distribution in the axial direction of a core tube of the apparatus.

The γ-thermometer 14 has a sensitive portion having a height corresponding to the effective height H of the core section 12 of the reactor 11. A plurality of, for example, eight, sensor sections 15 are provided in the sensitive portion of the γ-thermometer 14. The sensor sections 15 are arranged in a series extending in the axial direction of the γ-thermometer 14 with suitable intervals therebetween. As shown in FIG. 2, the γ-thermometer 14 forms a rod-shaped structure having a double-tube construction in which a core tube 18 made of metal is press-fitted and retained in a cover tube 17, so that the cover tube 17 constitutes an outer cover tube while the core tube 18 constitutes an inner metal tube. The cover tube 17 and the core tube 18 are made of a metal material having excellent high-temperature corrosion resistance and excellent heat conductivity, such as stainless steel or a zircaloy.

The core tube 18 has a plurality of annular recesses (gaps) 20 formed around the circumference thereof by recessing the core tube 18 from the outer surface thereof. The annular recesses 20 are covered and tightly sealed by the inner surface of the cover tube 17, whereby a plurality of annular gaps 21 are defined or formed between the cover tube 17 and the core tube 18. The annular gaps 21 are provided in the same number as the sensor sections 15 at different positions of the sensitive portion of the γ-thermometer 14 which are spaced from each other by suitable intervals in the axial direction of the sensitive section, each annular gap 21 serving as an adiabatic portion. The annular gaps 21 are filled with an inert gas such as argon gas.

Figure 3A:
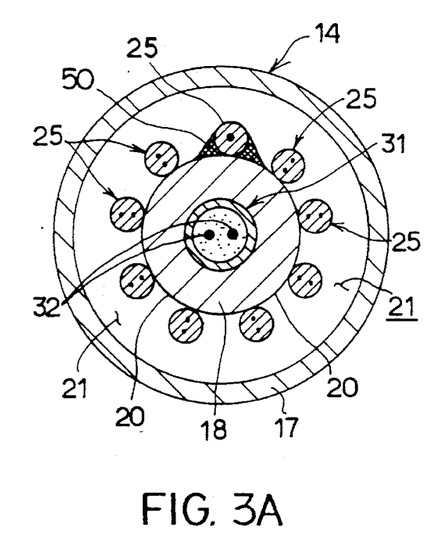
FIG. 3A is a cross-sectional view taken in a plane along line IIIA—IIIA shown in FIG. 2.
Figure 3B:
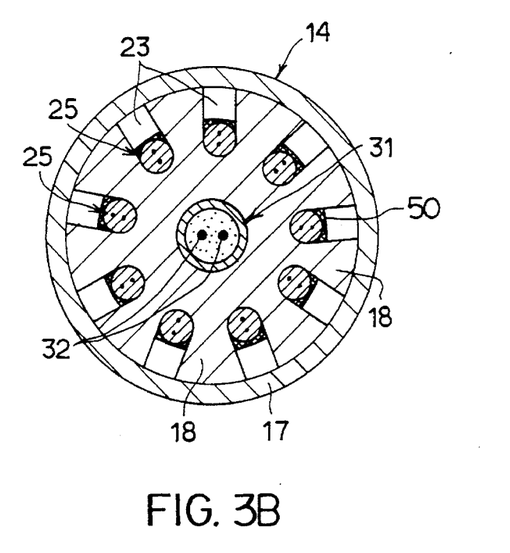
FIG. 3B is a cross-sectional view taken in a plane along line IIIB—IIIB shown in FIG. 2.
Figure 4:
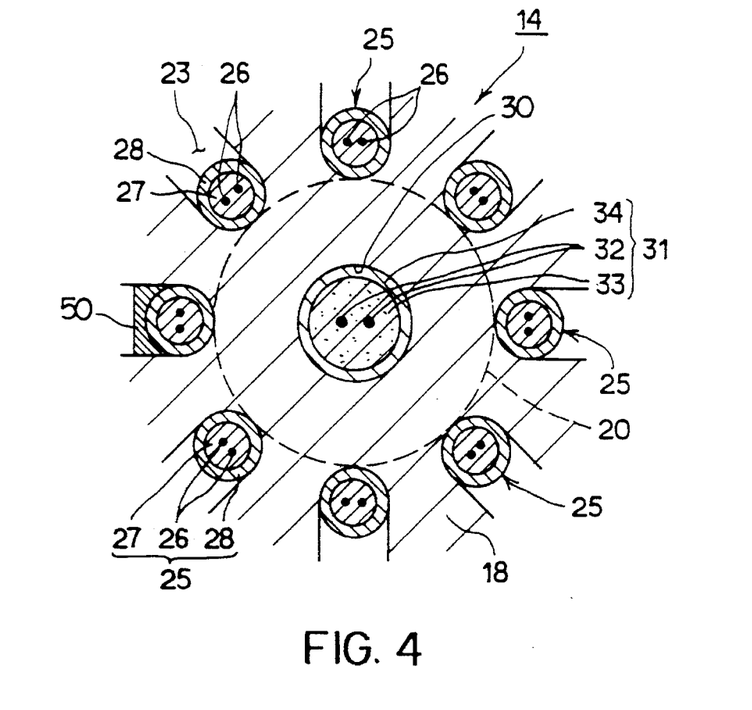
FIG. 4 is an enlarged view showing the arrangement of temperature sensors and a heater of the apparatus shown in FIG. 2.

The core tube 18 also has a plurality of axial grooves 23 formed therein in such a manner that each annular recess 20 communicates with an adjacent annular recess 20 through one of the axial grooves 23. As shown in FIGS. 3A, 3B and FIG. 4, the axial grooves 23, each extending in the axial direction of the core tube 18, are formed in the same number as the sensor sections 15, and are arranged in a radial pattern in which the depths of the axial grooves 23 lie in radial directions. Each axial groove 23 opens on the outer peripheral surface of the core tube 18.

A temperature sensor 25 is disposed in each axial groove 23. As shown in FIG. 4, each temperature sensor 25 includes a measurement member comprising a differential thermocouple 26 subsequently coated with an insulating coating 27 and a metal coating 28. The metal coating 28 of each temperature sensor 25 is secured to the core tube 18 by, for example, brazing the metal coating 28 with a brazing material 50. Thus, the temperature sensors 25 are retained by brazing, soldering or a like technique in such a manner that the temperature sensors 25 sufficiently contact the bottoms of the axial grooves 23 and the annular recesses 20. As shown, the grooves are parallel throughout their active length and are of a substantially constant depth from an outer surface of the core tube 18.

A rod-shaped heater 31 is press-fitted and retained in an inner bore 30 axially formed in a central portion of the core tube 18. The heater 31 includes a rod-shaped heater body 32 subsequently coated with an insulating coating 33 and a metal coating 34.

Next, a method for manufacturing the γ-thermometer 14 of the reactor power measurement apparatus will be described with reference to FIG. 2.

The γ-thermometer 14, which is to measure the power of the relevant reactor by utilizing heat generation due to γ radiation, is manufactured in the following manner: First, the rod-shaped heater 31 is press-fitted and retained in the inner bore 30 of the core tube 18. Thereafter, the annular recesses 20 and the axial grooves 23 in which the temperature sensors 25 are to be received, are formed by cutting outer surface portions of the core tube 18.

Subsequently, the temperature sensors 25 having the thermocouples 26 and the coatings 27 and 28 thereon are disposed in the annular recesses 20 and the individual axial grooves 23. After each temperature sensor 25 has been thus disposed, a high-temperature contact point Th portion of the sensor 25, which is to form a measurement point positioned in the corresponding annular recess 20, is retained by, for example, brazing the portion, and a low-temperature contact point Tc portion is retained in the corresponding axial groove 23 by, for example, brazing the portion. Then, each temperature sensor 25 is retained in the corresponding axial groove 23 from the outside of the core tube 18 by using a brazing material 50 or the like. Finally, the cover tube 17 is press-fitted on the outer surface of the core tube 18.

In the resulting structure, the temperature sensors 25 having the thermocouples 26 as their measurement members are retained in the annular recesses 20 and the axial grooves 23 by a brazing technique or the like, and are thus integrally contacted with the core tube 18. Consequently, the resulting structure has high heat conductivity while being free from deformation, and hence, involving reduced risk of insulation failure or the like. Thus, it is possible to accurately measure temperatures at points Th and Tc, such as those shown in FIG. 2 and FIG. 5.

In the above structure, since the temperature sensors 25 having the thermocouples 26 do not directly contact the rod-shaped heater 31, the thermocouples 26 are prevented from being heated excessively during the operation of the heater 31. This makes it possible to reduce the risk of problems such as disconnection and insulation failure.

Figure 5:
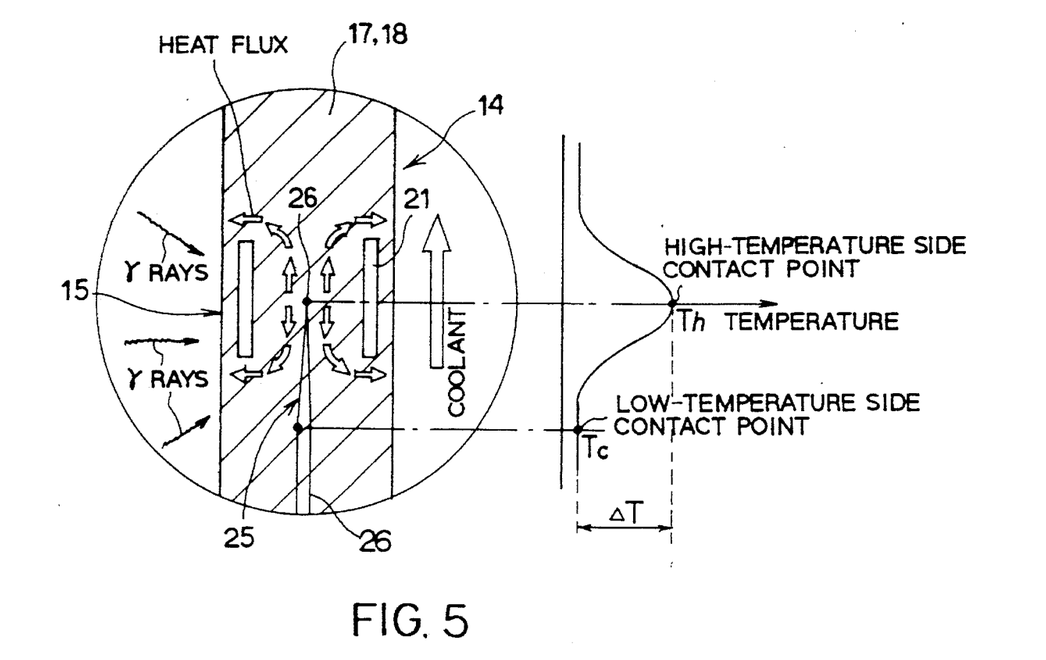
FIG. 5 is an enlarged view of a portion V shown in FIG. 1, the view depicting the construction of a sensor section of the apparatus shown in FIG. 1, as well as the principles of measurement of temperature distribution in the axial direction of the core tube.

Temperature distribution in the axial direction of the core tube 18 of the γ-thermometer 14 is similar to that in the conventional apparatus since the annular gaps 21 (the annular recesses 20) serve as adiabatic portions, as shown in FIGS. 2 and 5. When the γ-thermometer 14, serving as a sensor assembly, generates no heat, the temperature distribution is flat, as indicated by broken curve a in FIGS. 2 and 5. On the other hand, when the γ-thermometer 14 generates heat due to γ radiation in the core section 12 caused by the operation of the nuclear reactor 11a, temperature distribution such as that indicated by solid curve b is formed, in which temperature is increased at the positions of the adiabatic annular gaps 21 corresponding with the power of the reactor 11. Thus, when such temperature increment ΔT is measured with temperature sensors 25 having measurement members comprising the thermocouples 26 or the like, it is possible to measure the power of the nuclear reactor 11.

Causing the heating action of the heater body 32 of the rod-shaped heater 31 to thereby directly heat the core tube 18 makes it possible to form a temperature distribution approximating the temperature distribution formed by heat generation due to radiation (γ radiation). Thus, it is possible to calibrate the sensitivity of the temperature sensors 25 without the risk of excessively heating the thermocouples 26.

The γ-thermometer 14 measures, with the thermocouples 26, the calorific power of γ rays, a kind of radiation, so as to measure the power from the peripheral nuclear fuel, which power is proportional to the calorific power of γ rays. The principles of this measurement are shown in FIG. 5.

Referring to FIG. 5, when the γ-thermometer 14, at a fixed position in the core section 12 of the reactor 11, is irradiated with γ rays from fuel on the periphery of the γ-thermometer 14, and is thus heated, the existence of the annular gaps 21 serving as adiabatic portions causes heat generated inward of each annular gap 21 to flow toward end portions of the annular gap 21 in two opposite axial directions, as indicated by short white arrows in FIG. 5. The flow of heat (heat flux) in two opposite axial directions creates, in the corresponding sensor section 15, temperature distribution in the axial direction. A difference in temperature measured by each differential thermocouple 26 is proportional to calorific power of γ rays, and is also proportional to a heat power of the peripheral fuel. Therefore, when the calorific power of γ rays is measured, the fuel power on the periphery of the γ-thermometer 14 can be obtained.

A signal indicating the results of measurement by each γ-thermometer 14 has a value approximated by the following formula when, for example, stainless steel is used as the structural material for the core tube and the cover tube which constitute the γ-thermometer 14:

$$U = Se \cdot \frac{\rho \cdot w \cdot L^2}{2k}$$

where
U represents the value of measurement signal (μV)
Se is the Seebeck coefficient (40 μV/°C.)
W denotes calorific power of γ rays (W/g)
L is one half of the axial length of the gas-filled portion (annular gap) (cm)
k represents the thermal conductivity of stainless steel (W/°C. -cm)
ρ denotes the density of stainless steel (g/cm$^3$)

Figure 6:
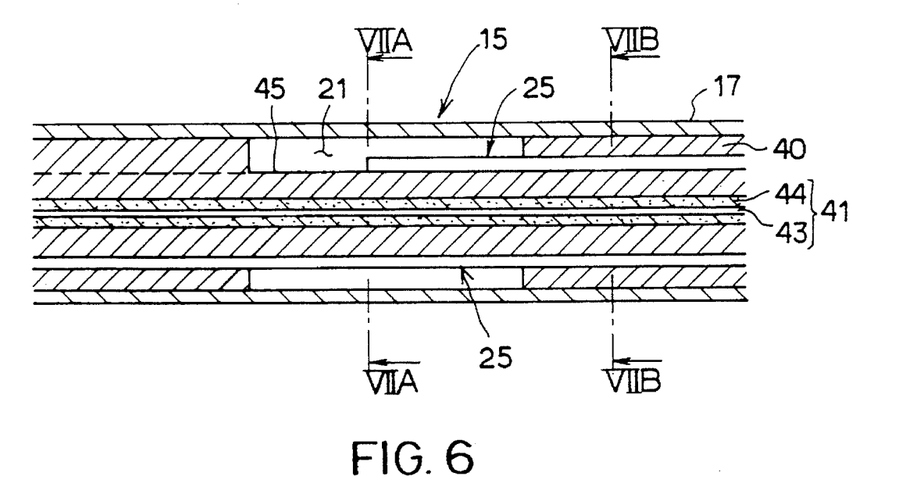
FIG. 6 is a view showing the construction of a sensor section of another embodiment of the present invention.
Figure 7A:
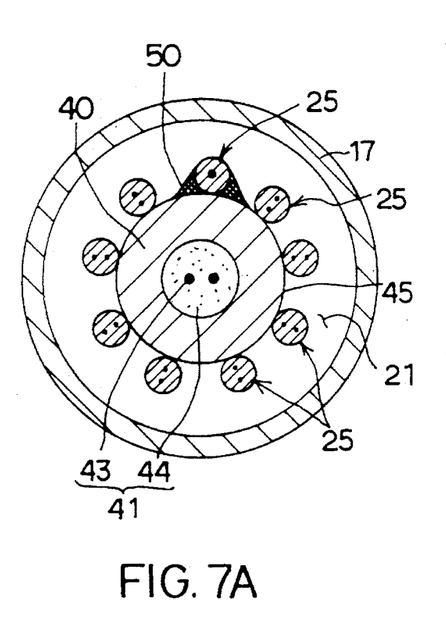
FIG. 7A is a cross-sectional view taken in a plane taken along line VIIA—VIIA in FIG. 6.
Figure 7B:
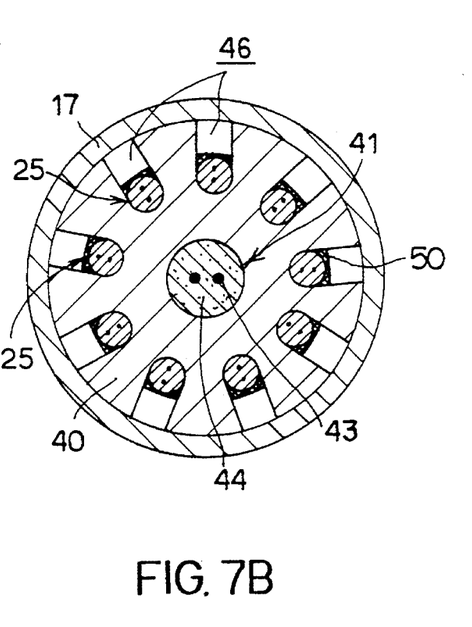
FIG. 7B is a cross-sectional view taken in a plane taken along line VIIB—VIIB in FIG. 6.
Figure 8:
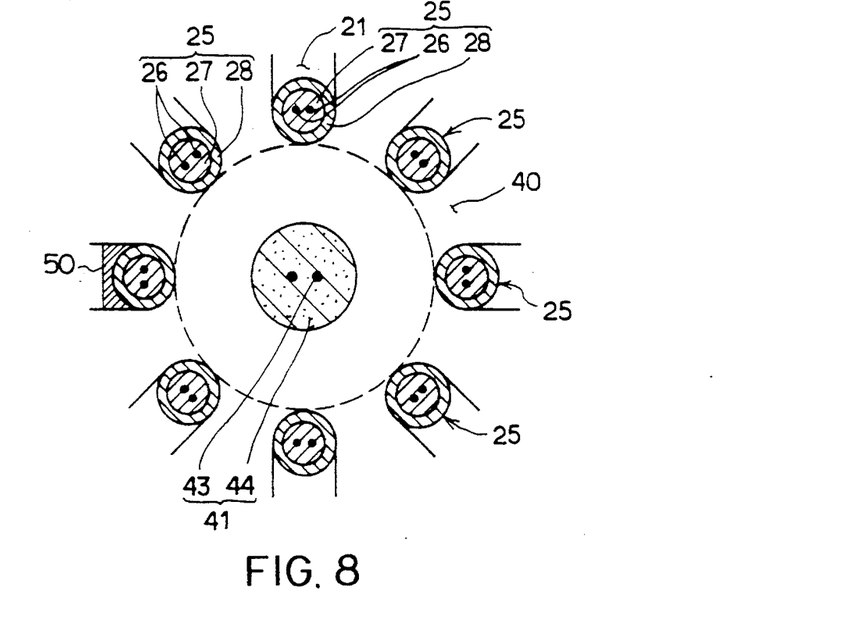
FIG. 8 is an enlarged view showing an example of the arrangement of temperature sensors and a heater of the embodiment shown in FIG. 6.

FIG. 6 through FIG. 8 show another embodiment of an apparatus for measuring the power of a nuclear reactor according to the present invention.

In this embodiment, the reactor power measurement apparatus has a γ-thermometer that includes a rod-shaped core tube 40 made of metal, the core tube 40 being arranged to serve as both the core tube of the apparatus and a metal coating of a rod-shaped heater 41 of the same. In other words, the embodiment shown in FIGS. 6 to 8 lacks a member corresponding to the metal coating 34 of the rod-shaped heater 31 shown in FIG. 4. As shown in FIG. 6, the rod-shaped heater 41 has a heater body 43 press-fitted and retained in the core tube 40 with an insulating coating 44 between the heater body 43 and the core tube 40. Thus, the heater body 43 of the rod-shaped heater 41 is covered with a relatively thick metal layer.

The core tube 40, forming the metal coating over the heater body 43, has a plurality of annular recesses 45 circumferentially formed opening on the outer surface of the core tube 40, each annular recess 45 being such as that shown in FIG. 7A. The annular recesses 45 are formed in the same number as the sensor sections of the γ-thermometer by recessing the core tube 40 from the outer surface thereof at different positions of the core tube 40 which are spaced from each other in the axial direction of the core tube 40. The core tube 40 also has a plurality of axial grooves 46 extending in the axial direction thereof in such a manner that each of the annular recesses 45 communicates with an adjacent annular recess 45 through one of the axial grooves 46. Temperature sensors 25 are disposed in the annular recesses 45 and the individual axial grooves 46. As shown in FIG. 7B and FIG. 8, the axial grooves 46 are arranged in a radial pattern in which the axial grooves 46 have their openings on the outer surface of the core tube 40 and their depths in radial directions. This arrangement makes it possible for the temperature sensors 25 in the process of being disposed in the annular recesses 45 and the axial grooves 46 to be readily contacted with the core tube 40. The temperature sensors 25 are integrally contacted with the bottoms of the annular recesses 45 and the axial grooves 46 of the core member 40 by brazing, soldering or a like technique using a brazing material 50.

It is particularly advantageous to impart, to the bottoms of the axial grooves 46, a cross-sectional configuration matching the cross-sectional configuration of the temperature sensor, so that the axial grooves 46 have a semi-circular configuration at their bottoms when the temperature sensors 25 have a semi-circular outer configuration, as shown in FIG. 7B and FIG. 8. The adoption of this arrangement makes it possible to greatly improve the contact between the core tube 40 and the temperature sensors 25 without employing a technique such as swaging.

A cover tube 17 made of metal is press-fitted and retained on the outer surface of the core tube 40 forming the metal coating over the heater body 43. The constructions of the embodiment shown in FIGS. 6 to 8 other than those described above, which are no different from corresponding constructions of the γ-thermometer 14 (sensor assembly) shown in FIGS. 2 to 4, are denoted by corresponding reference numerals and will not be described.

In the γ-thermometer of the second embodiment, when the sensor assembly generates heat due to radiation in the nuclear reactor or when the heater 32 in the sensor assembly also generates heat, temperature increases occur in the annular gaps 21 partially defined by the core tube 40 forming the metal coating of the rod-shaped heater 41. Consequently, operation and effect similar to that of the γ-thermometer of the previous embodiment is obtained.

As has been described above, a power measurement apparatus for a nuclear reactor according to the present invention has a sensor assembly including a plurality of annular gaps which are defined between a rod-shaped metal core tube and a cover tube press-fitted on the outer surface of the core tube and which are formed at different positions spaced from each other in the axial direction of the core tube, and also including a plurality of temperature sensors disposed in a plurality of axial grooves which are formed in the core tube while extending in the axial direction of the core tube and opening on the outer surface of the core tube. By virtue of the above construction, the temperature sensors can be readily retained in the axial grooves while in close contact with the core tube, and this is advantageous in that a power measurement apparatus for a nuclear reactor that has annular gaps between the cover tube and the core tube and also has temperature sensors closely contacting the core tube, can be simply and easily manufactured. A particular advantage of the above construction is that the temperature sensors can be secured, by brazing the temperature sensors, to the core tube from the outside of the core tube. This facilitates the process of assembling various members into the sensor assembly.

Since the power measurement apparatus for a nuclear reactor according to the present invention includes the plurality of annular gaps between the cover tube and the core tube, and also includes the plurality of temperature sensors closely contacting the core tube, the apparatus has high precision of temperature measurement, and results in a reduced risk of problems occurring such as disconnection and insulation failure so as to thus have high reliability.

When the apparatus includes a rod-shaped heater that is press-fitted and retained in an inner bore formed in a central portion of the core tube, the sensitivity of the sensor assembly can be calibrated by the heating action of the heater. Since such calibration does not involve the risk of the temperature sensors being excessively heated, the reactor power measurement apparatus can be even less vulnerable to problems such as disconnection and insulation failure.

What is claimed is:

1. An apparatus for measuring the temperature of a nuclear reactor, said apparatus having a sensor assembly disposed in a core section inside said nuclear reactor, said sensor assembly detecting temperature distribution in sensor sections of said sensor assembly so as to measure the power of said nuclear reactor, said sensor assembly comprising: a rod-shaped core tube made of metal; a cover tube made of metal and press-fitted on the outer surface of said core tube; a plurality of annular gaps defined between said cover tube and said core tube at different positions spaced from each other in the axial direction of said core tube; a plurality of axial grooves formed in said core tube while opening on the outer surface of said core tube and extending in the axial direction of said core tube; and a plurality of temperature sensors individually guided from the outer surface of said core tube in said axial grooves and disposed on said core tube, said temperature sensors of said sensor assembly detecting temperature distribution in portions of said core tube which face said annular gaps so as to measure the power of said nuclear reactor.

2. An apparatus according to claim 1, wherein said core tube has an inner bore formed in a central portion of said core tube, and a plurality of annular recesses formed around the circumference of said core tube by recessing said core tube from the outer surface thereof at different positions of said core tube spaced from each other in the axial direction of said core tube, said inner bore receiving a rod-shaped heater press-fitted and retained therein, each pair of adjacent annular recesses communicating with each other through one of said axial grooves comprising grooves which are arranged in a radial pattern with their depths lying in radial directions and which extend in the axial direction of said core tube.

3. An apparatus according to claim 2, wherein said rod-shaped heater has a heater body, an insulating coating on said heater body and a metal coating on said insulating coating, said metal coating being formed by said core tube.

4. An apparatus according to claim 1, wherein said axial grooves receiving said temperature sensors have bottoms configured to match an outer configuration of said temperature sensors so that said temperature sensors closely contact said bottoms of said axial grooves.

5. An apparatus according to claim 1, wherein said core tube and said cover tube are made of a heat-resistant corrosion-resistant alloy such as stainless steel or a zirconium alloy.

6. An apparatus according to claim 1, wherein each of said temperature sensors has a measurement member comprising a thermocouple.

7. A method of manufacturing an apparatus for measuring the temperature of a nuclear reactor, said apparatus having a sensor assembly detecting temperature distribution in sensor sections of the sensor assembly so as to measure the power of the nuclear reactor, said method comprising the steps of:

press-fitting a rod-shaped heater in an inner bore in a central portion of a rod-shaped core tube made of metal;

forming a plurality of annular recesses around the circumference of said core tube by recessing said core tube from the outer surface thereof at different positions of said core tube spaced from each other in the axial direction of said core tube;

forming a plurality of axial grooves in said core tube such that said axial grooves open on the outer surface of said core tube and extend in the axial direction of said core tube;

disposing a plurality of temperature sensors in the individual axial grooves from the outer surface of said core tube; and press-fitting a cover tube made of metal on the outer surface of said core tube.

8. An apparatus according to claim 1, wherein said axial grooves are parallel throughout substantially their entire length.

9. An apparatus according to claim 1, wherein said grooves are of a substantially constant depth from an outer surface of the core tube.

10. The method according to claim 7, wherein said forming of said axial grooves comprises forming said grooves so as to be parallel throughout substantially their entire length.

11. The method according to claim 7, wherein said forming of said axial grooves comprises forming said grooves so as to have a substantially constant depth as measured from an outer surface of the core tube.

12. An apparatus as claimed in claim 1, wherein said axial grooves are of a depth such that a gap is formed between each of said temperature sensors and said cover.

13. The method as claimed in claim 7, which comprises disposing said temperature sensors in the individual axial grooves such that a gap is formed between each of said temperature sensors and said cover.

* * * * *